INVENTOR
OTIS D. COSTON

United States Patent Office 3,422,281
Patented Jan. 14, 1969

3,422,281
ELECTRIC POWER BYPASS SYSTEM AND CONNECTORS FOR RECONVERSION OF RURAL ELECTRIC SERVICE SYSTEMS
Otis D. Coston, 1716 Exeter Ave., Bessemer, Ala. 35020
Filed Dec. 2, 1966, Ser. No. 598,816
U.S. Cl. 307—147　　　　　　　　　　　　9 Claims
Int. Cl. H01b 7/30; H01b 11/02; H01r 13/54

ABSTRACT OF THE DISCLOSURE

A portable, electric power bypass system for rebuilding existing power lines without interruption of service. The system is composed of prefabricated section of grounded surface cables which are serially joined by mating high voltage connectors. The mated connectors are received in conductive housings which prevent separation of connectors and which establish electrical connection between the grounded surface of the prefabricated sections to carry the ground through the system.

---

Many rural electric service systems designed to provide direct electric service from high voltage transmission power lines are becoming rapidly obsolete. With the installation of heavy duty equipment and greater reliance on modern appliances, it is frequently necessary to uprate, repair, rebuild or convert outdated rural electric service systems. Since the power lines leading from a distribution transformer located at the transmission line provide service to several users simultaneously, it is essential that conversion of the in-service power lines be accomplished with a minimum of uninterrupted service to the users and in a manner which would be safe for workmen and the public.

There is also a great need for providing a rapid reconnection of electric service from high voltage transmission power lines in areas where windstorms cause frequent interruption in electric power service. A rapid diversion of electric power from in-service lines, while sections of the damaged lines are disconnected and repaired, would substantially alleviate suffering and inconvenience to the users. With more and more reliance being placed on total electric living, any long periods of interrupted service can be disastrous.

Accordingly, it is a primary object of the present invention to provide an electric power bypass system which permits a rapid and economical diversion of electric power from in-service transmission lines.

Another object of the present invention is to provide an electric power bypass system which permits de-energization of a section of a transmission line in order to repair, rebuild or rephase the section and/or its feeder lines while maintaining uninterrupted service to the consumers.

A further object of the present invention is to provide an electric power bypass system for diversion of electric power from in-service transmission lines which provides safe, quick and convenient means for uprating existing electric service of farmstead or rural electric service installations.

Still another object of the present invention is to provide an electric power bypass system for diversion of electric power from in-service transmission lines which provides a maximum of safety to the workmen and to the public, and which can be rapidly assembled and disconnected.

In accordance with the present invention, the dangers of working a hot line while repairing or rebuilding existing power service lines are avoided, while uninterrupted service is provided to the consumer. To this end, the service equipment of the present invention permits rural electric installations to be updated with a minimum of inconvenience to the users and a minimum of cost to the utility companies. The bypass system of the present invention is portable and can be moved and rapidly reconnected at new locations to facilitate progressive updating of the entire rural system.

These and other objects of the present invention and the attendant advantages will be readily apparent from the following description of the invention taken in connection with the accompanying drawings; however, it is to be expressly understood that these drawings are for the purpose of illustration only and are not intended to represent the full scope of the invention which is particularly pointed out and defined by the appended claims.

In the drawings, wherein like characters refer to like parts throughout the several figures, FIG. 1 is a diagrammatic view of a rural electric service system incorporating the electrical power bypass system of the present invention;

FIG. 3 is a broken out perspective view of a high voltage cable used in the present invention;

FIG. 6 is a fragmentary plan view, with the cover removed, of a step-down transformer and transformer connector box;

FIG. 7 is a fragmentary, elevational view of the step-down transformer and connector box shown in FIG. 7;

FIG. 8 is a fragmentary, cross sectional view of a high voltage connector for the transformer, with a high voltage plug in place;

FIG. 9 is a fragmentary plan view of a high voltage junction connector box with the cover removed; and FIG. 10 is a fragmentary, perspective view of a typical high voltage junction connector box and step-down transformer installation in accordance with the present invention.

Figure 1:
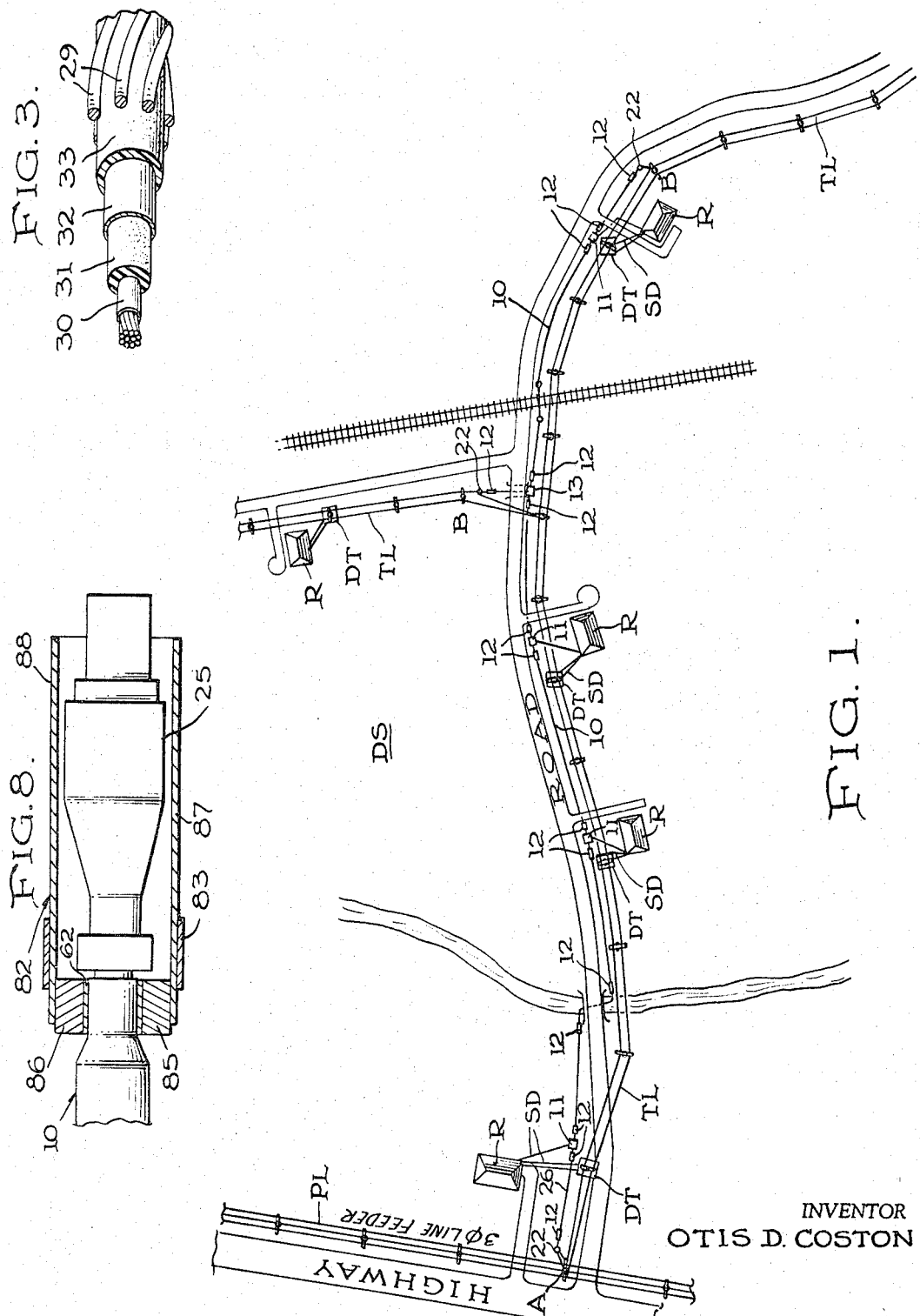

Referring now to the drawings, and in particular to FIG. 1, an exemplary rural electric service system is illustrated, comprising a three phase high voltage distribution line indicated at PL. Power line PL generally carries voltages of 7.5 kv. or higher and provides electrical power to various loads such as residences R through a single phase high voltage tap line TL. The voltage of the tap line is stepped down for low voltage residential use in a conventional manner through pole-hung distribution transformers DT located at spaced points along the line. Each distribution transformer has its high voltage bushings connected to TL and its low voltage bushings connected to the customary service drop conductors SD which supply conventional 110 volt A.C. to the house service. The low voltage service drop conductors may comprise a three wire single phase supply with one wire grounded or, for low demand services, a two wire single phase supply with one wire grounded, while TL comprises a pair of high voltage conductors, one of which is returned to ground.

It should be apparent from FIG. 1 that there is illustrated only a fragmentary portion of a rural distribution system which generally extends for several miles. For convenience, only a few service connections to residences R are illustrated; however, any number or type of service connections may be made within the power handling capabilities of the distribution system.

The electric power bypass of the present invention is designed to allow rapid diversion of electric power from an in-service section of a transmission line PL and provide uninterrupted service to the users while a de-energized section or a tap line is repaired, rebuilt or converted. To this end, a single main feed or high voltage grounded surface bypass cable 10 is connected between points A and B. Bypass cable 10 serves to carry high voltage power in the order of 7.5 kv. to the service equipment for distribution to the users. The service equipment comprises pad mounted HV step-down transformers 11, HV straight line connector boxes 12, and HV junction connector boxes 13 which allow the bypass cable to be preconstructed in several sections of various lengths so that the entire system is portable and can be rapidly set up or broken down. Each step-down transformer provides one or more service connections which are adapted for connection to the various electric loads through polarized plug-in connectors, while the input to each transformer is maintained through short, prefabricated sections of high voltage cable having HV connectors at both ends.

Bypass cable 10 is constructed to provide maximum safety for the workmen and for the public and to minimize the cost of equipment necessary to effect a diversion of power. To this end, the prefabricated sections of cable 10 have high voltage connectors affixed to their ends. The connectors are of the plug-in type so that several sections may be rapidly joined in series as needed. High voltage tap-offs may be made on the high voltage side of transformer 11 or through junction box connector 13. The ground return for the system is maintained through an outer or surface conductor on the bypass cable 10 and is carried through the conductive housings of the connector boxes 12 and junction boxes 13. The entire system is portable in that it can be broken down and/or assembled on location; and thus may be used to rapidly isolate damaged sections of transmission lines or provide uninterrupted service to the consumers while old lines are reconverted. Various lengths of prefabricated sections with plugs and receptacles attached are carried on reeling equipment (not shown). In this manner, the proper length cable may be rapidly reeled out ready for connection.

The several sections of cable 10 are joined together and run at ground level generally following the direction of the tap line TL to be worked. Each cable section includes a central inner conductor 30 adapted to be electrically connected to the high voltage conductor 16 of TL and an external conductor 29 adapted to be connected to the ground line G of TL. At locations where cable 10 crosses a roadway, a conventional roadway cable protector or portable overhead carrier (not shown) is provided.

Figure 2:
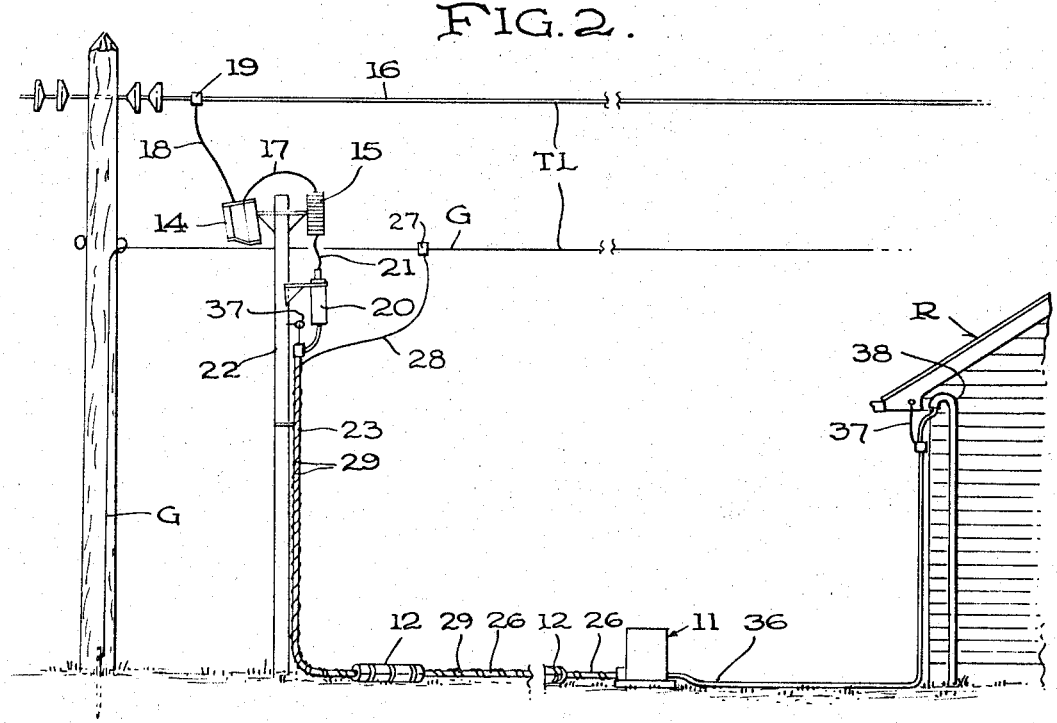
FIG. 2 is a view of the takeoff connection from the high voltage transmission line illustrating the manner of supplying power to a household load.

At each of points A and B, conductor 30 is connected to the high voltage line 16, through conventional protective equipment. Referring to FIG. 2, the protective equipment includes a fused cutout 14 and lightning arrester 15 electrically connected through jumpers 17. Cutout 14 is connected to high voltage conductor 16 through jumper 18 attached by means of a conventional hot line clamp 19. The protective components 14 and 15 are conventionally supported atop a telescopic pole 22 which also supports a high voltage cable terminator or stress cone 20 and a short section of cable 23. High voltage cable terminator 20 is electrically connected to arrester 15 through jumper 21.

Conductor 30 of cable section 23 is terminated at one end of stress cone 20 while the other end is terminated at ground level to high voltage receptacle 24. Receptacle 24 is adapted to mate with a high voltage plug 25 connected to one end of the central conductor 30 of another section 26 of bypass cable 10. The mating plug and receptacle are received in a grounded surface conductive housing or straight line connector box 12 which, in addition to preventing separation of the plug and receptacle, establishes the ground return path for the high voltage bypass system. To this end, the ground line G of TL is connected by clamp 27 through jumper 28 to the external helically wound surface conductor 29. Conductor 29 is terminated at the conductive housing of straight line connector 12.

The details of construction of cable 10 are most clearly illustrated in FIG. 3. Central conductor 30 may be fabricated from a plurality of twisted strands of wire surrounded by a layer of insulation 31 which may be, for example, cross-linked polyethylene. Layer 31 has wound thereon a thin conductive copper shielding tape 32. Another layer of insulation 33 which may also be polyethylene is provided over tape 32 to provide a further insulative barrier, and over layer 32 is helically wound conductor 29. Cable 10 is designed to carry voltages in the order of 5 to 15 kv. The central conductor 30 forms the high voltage conductor for the bypass system, while the outer surface conductor 29 forms the ground return. The shield 32 may be connected to conductor 29. This increases the grounding ability of the HV cable 10 and protects against dangers from breaks in insulation and the high voltage hazard when contact is made by personnel with an energized cable. Thus, although the rural system utilizes a pair of high voltage lines to carry the voltage, the bypass system utilizes a single power cable to transfer voltage from the power lines to the various loads which in itself provides a considerable savings in cost of equipment for effecting a power diversion.

As hereinbefore described, several sections of cable are joined at intervals by straight line connectors 12 to carry the high voltage to a step-down transformer 11, the low voltage output of which is connected to a residence R or other load through a service cable 36. As shown in FIG. 2, service cable 36 is supported to R by cable grip 37 and connected at the weatherhead 38 to the customer service. Upon installation, the existent overhead service drop SD is cut ahead of the weatherhead 38 to eliminate back feeding of electric power for safety.

Figure 4:
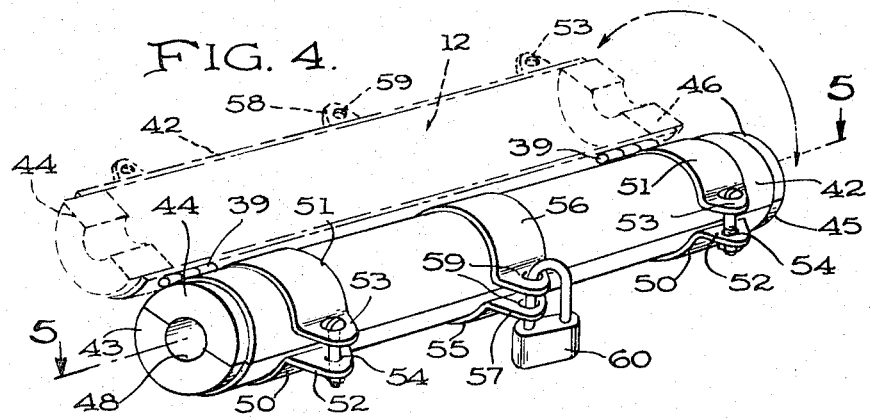
FIG. 4 is a perspective view of a straight line connector box of the present invention, the open position being illustrated by phantom lines.
Figure 5:
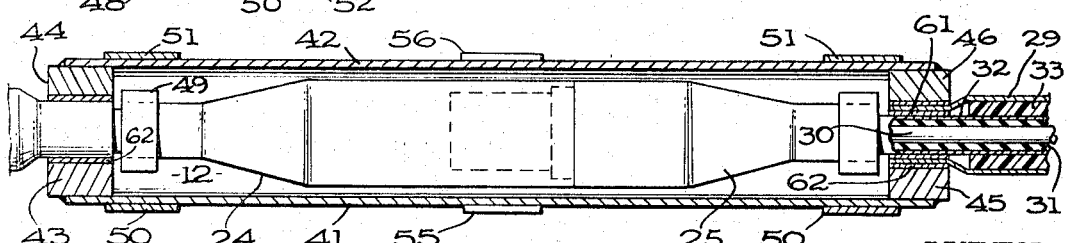
FIG. 5 is a fragmentary cross sectional elevational view of a straight line connector box with the high voltage plug and receptacle in place and the cable connected to one end of the connector box shown in cross section.

Referring to FIGS. 4 and 5, the details of a straight line connector box are illustrated. Each end of a cable section has its central conductor 30 connected to a high voltage receptacle 24 or plug 25. Any suitable commercial male and female mating connectors adapted for use with high voltage concentric neutral shielded cables may be utilized to provide the plug-in connections for adjacent sections of cable such, as for example, the Elastimold shielded high voltage connectors commercially available from the Elastimold Division of the Elastic Stop Nut Corporation of America.

After a mating plug and receptacle are joined, the plug and receptacle are housed within connector box 12 to protect and prevent separation thereof while a high voltage line is energized. Connector box 12 also provides electrical continuity for the ground conductors 29 of adjacent sections of cable 10 so as to carry through the grounded neutral of the system. To this end, connector box 12 is fabricated of a highly conductive material such as, for example, copper and comprises a pair of similar sections 41 and 42. Sections 41 and 42 are attached adjacent opposite ends by hinges 39 and are swung to an open position to receive a mated receptacle 24 and plug 25. Preferably, the mating sections 41 and 42 are hollow and semi-cylindrical in shape, the length being such that they snugly receive a mated receptacle and plug; however, it should be apparent that the shape of the sections 41 and 42 and the chamber 40 formed when the sections are closed is determined by the shape of the HV receptacle and plug.

At each end of the connector box 12, each section has secured thereto a conductive end piece 43–46 which may be fabricated of copper. The outer surface of each end piece conforms to the shape of the inner surface of the section to which it is secured in any suitable manner. Each end piece 43–46 has a central portion 47 cut away or grooved so that adjacent end pieces 43–44 and 45–46 when the sections 41 and 42 of a connector box are closed, cooperate with each other to form a ring-like enclosure about cable 10. Cable 10 passes through opening 48 formed by adjacent cut-away portions of the end pieces which are clamped tightly about the cable to complete the connection between connector box 12 and conductor 29. The size of opening 48 is smaller than that of the adjacent end section or adapter 49 of a receptacle or plug. Thus, accidental separation of the receptacle and plug is prevented once sections 41 and 42 are closed.

To maintain sections 41 and 42 closed, each section has secured thereto spaced straps 50 and 51 having extending lip or flange portions 52 and 53, respectively. Each lip is provided with an aperture adapted to receive a latching bolt 54 when the sections of the connector box 12 are closed. One of the apertures such as, for example, that in lip 52 may be threaded or a separate nut may be used to latch the sections 41 and 42 closed. In the alternative, flange portion 52 may be slotted to allow the bolt to be swung in place for latching to increase the speed of making the HV cable connections.

As a further safety precaution, to prevent tampering and unauthorized access to the connector box when the bypass cable 10 is energized, a further pair of straps 55 and 56 may be provided. Each strap has a lip member 57 and 58, respectively and each lip is apertured as at 59 through which a padlock 60 or other suitable locking or indicating means may be inserted cautioning workers that the connection is energized.

Referring to FIG. 5, there is illustrated in detail the manner in which the ground connection between the cable 10 and connector box 12 is carried through. As hereinbefore described conductor 29 is maintained in electrical contact with the conductive housing of the connector box through a pair of cooperating end pieces, such as 46 and 47, which clamp about the cable when the connector box is closed. To this end, the concentric shield and outer conductors 32 and 29 of cable 10 are terminated adjacent the entry of a cable section to a receptacle or plug and connected to a pair of concentric ring or sleeve members 61 and 62 which form a plug-like member adapted to be received within the opening formed by adjacent end pieces of the closed connector box. Copper sleeve 61 is placed over the end of shield conductor 32. Conductor 29 is placed over sleeve 61 and copper sleeve 62 slipped over the outer conductor. Advantageously, the connection may be made permanent by soldering.

Step-down transformers 11 used in the bypass system of the present invention are conventional and serve to reduce the high voltage from approximately 7.5 kv. to 110 volts for application to conventional household loads through service cable 36. As most clearly shown in FIGS. 6–8, each transformer may be of the oil insulated type disposed within an oil filled tank 65 and having its HV input winding (not shown) adapted for external connection through HV bushings 66, 67 and ground terminal 68. The low voltage output of transformer 11 is taken from bushings 69, 70 and ground terminal 71 which are advantageously connected to one or more polarized output receptacles 72 mounted to housing 73. Receptacle 72 provides a rapid manner for connecting the service cable 36 to the transformer. Of course, service cable 36 is available in various lengths and advantageously stored on reeling equipment specially designed to handle the prefabricated cable which includes a mating plug connector on one end adapted to be received in output receptacle 72. Thus, for installation, it is only necessary to reel out the proper length cable and connect one end to the house service. The connector end is coupled to the mating output receptacle 72.

To facilitate connection of the transformer on the HV side, a high voltage plug-in connection is provided through transformer connector box 74. Connector box 74 is mounted to housing 73 and, in addition to holding the HV connectors in place for maximum performance, also serves to lock the transformer when energized for safety. Connector box 74 is supported to a recessed wall 75 of housing 73 and adapted to receive a pair of HV plug connectors 76. Each plug connector is identical and mates with a corresponding HV elbow receptacle 77 mounted within housing 73 and connected to the HV bushings 66 and 67 through conventional stress cones 78. The other end of each elbow terminates at the recessed wall 75 which is provided with a pair of adjacent circular openings within which are secured copper sleeves 79 and 80.

Copper sleeves 79 and 80 serve to carry through the electrical connection between surface conductor 29 and transformer ground. To this end, within housing 73 the copper sleeves are connected to ground terminals 68 through jumper 81. Outside of housing 73, each plug 76 is received in a grounded surface housing 82 which is similar to the grounded surface housing of straight line connector box 12 hereinbefore described. As can be seen from FIG. 8 housing 82 differs from the previously described connector box 12 in that it only supports a plug connector as opposed to a mated plug and receptacle. The external ground is carried through end pieces 85 and 86 and conductive housing sections 87 and 88 in the same manner as that of connector box 12. The open side of the hinged housing sections 87 and 88 are disposed to be clamped about the peripheral surface of copper sleeve 79 or 80 and locked tightly thereabout by the housing hinge strap 83.

To lock the HV connection connector box 74 in place, a removable end wall 89 is provided. The central portion of end wall 89 is cut away as at 90 and provided with a pair of spaced grooves or notches 91, 92 disposed to receive and support the cables adjacent end pieces 85 and 86 of the grounded surface connector. The flat inner side of end wall 89 is positioned to bear against the end pieces of the connectors and to lock the connectors in place by fastening bolts 93, 94 secured to the recessed wall 75 of the housing 73.

When it is desirable to provide electric power to HV tap lines TL from the bypass system, a high voltage grounded surface junction 95 may be utilized. Referring to FIGS. 9 and 10, junction 95 comprises a plurality of HV elbow connectors 96 each of which is commonly terminated within a central insulative enclosure 97. The other end of each elbow receptacle 96 has a short length of cable 98 connected thereto with the other end of each cable section having a high voltage plug 99 attached. As hereinbefore described, the high voltage plug is adapted to be received in a grounded surface box to ensure that the ground is carried through.

Grounded surface junction 95 is enclosed within a conductive housing 100 to which access may be had through its hinged cover 101. Cables 98 pass outwardly from the closed housing through passages 10 formed either in the side walls or the cover. Each cable section 98 is provided with a ground clamp 103 within housing 100 and the several ground clamps are commonly joined to a central box ground terminal 10 through jumpers 105. The surface conductor 29 of each cable section is joined as hereinbefore described with the concentric inner shield conductor 13 to provide a continuous grounded neutral for the HV tap lines through the junction 95.

Thus, there has been described an electric power bypass system adapted to divert electric power to residential loads from a high voltage transmission line in order to repair, rebuild or convert from a single phase power to two or three phase power while maintaining uninterrupted service to the consumer. The system is prefabricated and entirely portable and can be reused at various locations to provide a continuous updating of existing lines. Although only one particular embodiment of the invention has been described and illustrated, it will be obvious to those skilled in the art that various modifications may be made. For example, where only one tap off is necessary at the high voltage grounded surface junction 95, a simplified T connection may be utilized comprising a female HV T-receptacle adapted to receive a male HV plug at each end. The mated plug and receptacles are received in a conductive housing fabricated in a manner similar to that of a straight line connector box 12, but formed in the shape of a T. It is therefore intended by the appended claims to cover all such modifications which fall within the scope of the invention.

What is claimed is:

1. In an electric power bypass system for diverting power to a load from a high voltage transmission line having at least a main power conductor and a ground return conductor, a single high voltage cable comprising a plurality of sections, each section having an inner high voltage conductor and an outer surface conductor, said inner conductor being connected at one end of said cable to said main power conductor, said surface conductor being connected at said one end of said cable to said ground return conductor, means for serially connecting said sections including a mating high voltage plug and receptacle separately connected to the inner conductor of adjacent sections, a grounded surface connector box adapted to receive the mated plug and receptacle, said connector box being fabricated from a conductive housing, means for connecting the outer surface conductor of adjacent sections to opposite ends of said connector box whereby the ground return of the system is carried through the grounded surface connector box, a step-down transformer for reducing the voltage of said high voltage transmission line including high voltage input terminals and low voltage output terminals, means for the connecting of the other end of the inner conductor of said cable and the other end of the surface conductor of said cable to the input terminals and means for connecting the output terminals to the load.

2. In an electric power bypass system as set forth in claim 1 wherein said grounded surface connector box comprises a pair of hinged sections forming a housing adapted to receive said mated plug and receptacle and prevent separation thereof when said hinged sections are closed, and said means for connecting the outer surface conductor includes cooperating conductive end pieces at opposite ends of the hinged sections forming a ring connector when said hinged sections are closed for establishing the electrical ground connection between the surface conductors of adjacent cable sections and the conductive housing of said grounded surface connector box.

3. An electric power bypass system as set forth in claim 2 wherein said single high voltage cable comprises a conductive shield intermediate said inner conductor and said surface conductor and insulated therefrom, said shield being joined to said surface conductor at the ends of each section.

4. An electric power bypass system as set forth in claim 3 wherein each section of cable adapted to be received in a grounded surface connector box includes a pair of concentric conductive sleeve members, one of said sleeve members being disposed between said conductive shield and said surface conductor, the other of said sleeve members being disposed over said surface conductor, to thereby form a plug adapted to be received in the ring connector formed by said end pieces.

5. An electric power bypass system as set forth in claim 4 further including a high voltage junction in said high voltage cable for supplying high voltage electric power to a further section of high voltage cable having an inner high voltage conductor and a surface ground return conductor, said high voltage junction comprising a grounded surface conductive housing having a plurality of insulated high voltage receptacles therein, said high voltage receptacles being joined at a common point and adapted to receive mating plug connectors electrically connected to the inner conductors of sections of high voltage cable and means for connecting the conductive housing of said junction to the surface conductor of said sections of cable whereby the ground return of the system is carried to the grounded surface junction box.

6. A high voltage junction for electrically connecting two sections of high voltage cable adapted to be energized from at least a 7.5 kv. transmission line having a main power conductor and a ground conductor, each section including a central conductor and a surface conductor insulated therefrom, a male high voltage connector connected to one end of one of said central conductors, a mating female high voltage connector connected to one end of the other central conductor, a conductive connector box having an open and a closed position, said connector box being adapted in its open position to receive the mated male and female connectors and in its closed position to prevent separation of the mated male and female connectors, a pair of conductive end pieces secured at each opposite end of said connector box and being arranged to clamp about the surface conductor of one of said sections of high voltage cable for establishing electrical connection between the surface conductors of said sections through the connector box, the other ends of said central conductors and surface conductors of the sections being arranged for connection to the main power conductor and ground return line of the transmission line.

7. A high voltage junction as set forth in claim 6 wherein said connector box comprises a pair of hinged sections, a strap member externally affixed to each section, each strap member having an extending flange portion adapted to be aligned when the connector box is closed and means for latching said flange portions together to prevent opening of said connector box.

8. A high voltage junction as set forth in claim 6 wherein said surface conductors of each section are terminated adjacent the point of connection of the central conductors of the sections to said connectors by a sleeve member, said sleeve members being adapted to be received and clamped by the end pieces of a closed connector box.

9. A high voltage junction as set forth in claim 7 wherein each section of high voltage cable further includes a conductive shield intermediate said central conductor and said surface conductor and insulated therefrom, a pair of concentric conductive sleeve members terminating said surface conductors and said intermediate conductive shields adjacent the point of connection of the central conductors of the sections to said connectors, said sleeve members being electrically connected and adapted to be received and clamped by the end pieces of a closed connector box.

References Cited
UNITED STATES PATENTS

| | | | |
|---|---|---|---|
| 2,748,359 | 5/1956 | Swan | 339—28 |
| 2,955,272 | 10/1960 | Gallardo | 339—37 |
| 3,109,690 | 11/1963 | Stevens. | |
| 3,183,470 | 5/1965 | Hale | 339—82 |

ROBERT K. SCHAEFER, *Primary Examiner.*

T. B. JOIKE, *Assistant Examiner.*

U.S. Cl. X.R.

317—122; 339—82